April 28, 1970      R. B. WILSON      3,508,595
COVER LAYER FOR TIRE SIDEWALL
Filed Oct. 23, 1967
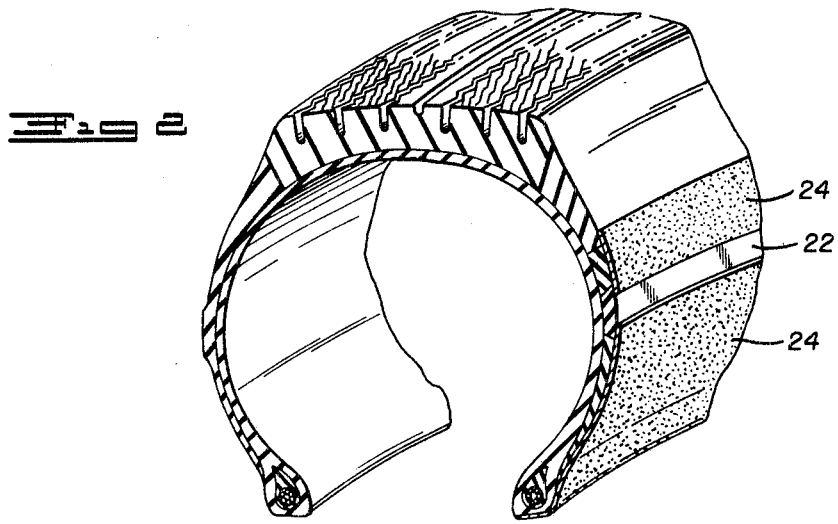
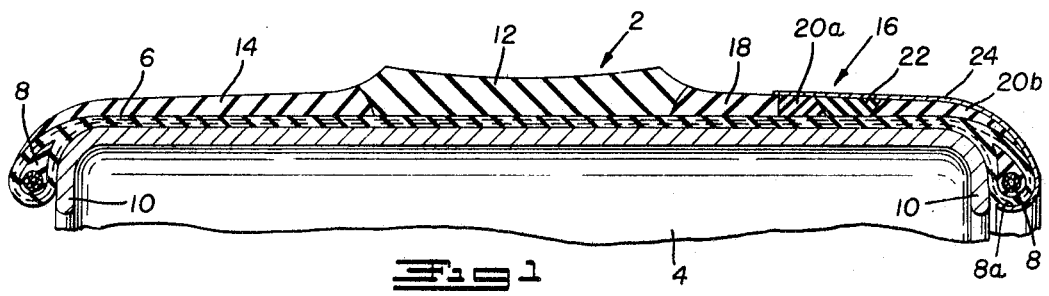
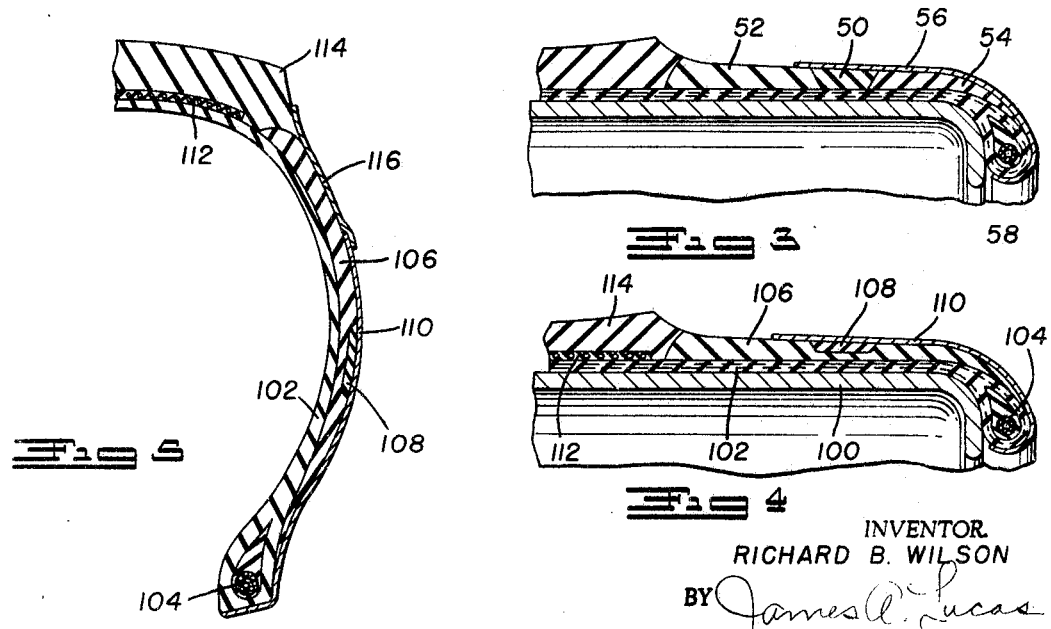
INVENTOR.
RICHARD B. WILSON
BY *James A. Lucas*
ATTORNEY

United States Patent Office 3,508,595
Patented Apr. 28, 1970

3,508,595
COVER LAYER FOR TIRE SIDEWALL
Richard B. Wilson, Akron, Ohio, assignor to The General Tire & Rubber Company, a corporation of Ohio
Filed Oct. 23, 1967, Ser. No. 677,097
Int. Cl. B60c *1/00, 13/00;* B08c *9/08*
U.S. Cl. 152—330                        6 Claims

ABSTRACT OF THE DISCLOSURE

An improved cover gum compound for use over another compound, such as a white sidewall, is composed of an elastomeric composition containing a blend of natural rubber, chlorobutyl rubber and ethylene propylene terpolymer. This compound, in addition to possessing good processing characteristics, is non-staining and is highly weather resistant.

---

Whitewall tires have been on the market for many years. Currently, various designs, as well as a variety of colors are being used in the tire sidewall in an effort to enhance the decorativeness of the tire. The whitewall or decoration can be incorporated into the tire in any number of ways. Typically, a whitewall tire is built by constructing the tire carcass on a cylindrical drum, said carcass composed of one, two or more plys of calendered fabric such as nylon or rayon. Tread and sidewall portions are then wrapped around the carcass. A portion of the normal blackwall is replaced by a strip of white rubber which is covered with a thin strip of protective rubber. The tire is then formed into toric shape and is vulcanized in an appropriate mold containing the desired tread pattern. After the tire is removed from the mold a portion of the protective rubber is buffed off to expose the white rubber.

It is important that the components used to produce the white sidewall be properly formulated so that the sidewall will retain its flexibility, will be easy to clean and will have good weathering properties. It is equally important that the layer of protective rubber over this white rubber have desirable properties, among them being:

(a) good weathering resistance,
(b) good abrasion resistance,
(c) compatibility with the other materials in the tire principally the white sidewall materials,
(d) good green strength and tack during preparation, extrusion and handling, and
(e) good adhesion to the sidewall and tire tread prior to and after curing.

It is difficult to find a protective cover which possesses all of these properties. In some instances in the preparation of the sidewall of the tire the white sidewall portion is formed by extrusion through a tuber whereupon the protective layer is calendered while hot directly on to the white strip. It has been found that air becomes entrapped in the formulation comprising the protective layer during the calendering of the same. During the subsequent curing of the tire this air often, because of its inability to escape, causes blistering of the protective layer. These blisters detract from the appearance of the sidewall.

It is an object of the present invention to provide a sidewall protective cover for tires that possess all of the desirable characteristics, and overcomes various deficiencies of existing protective layers.

It is another object of this invention to provide a cover material having very good processing characteristics during the fabrication of a tire and outstanding resistance to weather and abrasion.

It is still another object of the invention to provide a sidewall cover layer comprising an elastomeric blend composed of chlorobutyl, natural rubber and ethylene propylene terpolymer.

These and other objects are accomplished in the manner to be hereinafter described with particular reference to the drawings wherein:

FIGURE 1 is a cross-sectional view of a tire assembled on a tire building drum;

FIGURE 2 is a partial perspective view of the completed tire constructed in accordance with the details of FIGURE 1;

FIGURE 3 is a partial cross-sectional view, similar to that shown in FIGURE 1 showing a slightly different arrangement of components;

FIGURE 4 is a view similar to that of FIGURE 3 showing a different embodiment of the invention, particularly applicable to radial ply tires; and FIGURE 5 is a partial cross-sectional view of the tire shown in FIGURE 4 after expansion but prior to curing.

In brief the invention resides in the use of a protective cover layer over the unexposed portion of a decorative sidewall for a tire, said layer containing a blend of between about 10 and about 30 parts of ethylene propylene terpolymer, between about 40 and about 60 parts of natural rubber and between about 20 and about 50 parts of chlorobutyl rubber. The protective layer is applied over the decorative strip during the tire building operation. After the tire is cured, a portion of said layer is removed to expose a part of the decorative strip.

Referring now to the drawings, FIGURE 1 shows a tire 2 assembled on to a flat drum 4 and composed of a carcass 6 consisting of one, two or more plys of fabric material such as nylon, rayon, polyester or fiberglass. The edges of the carcass are wrapped around the inextensible beads 8 overlying the shoulder portion 10 of the drum. On top of the carcass is positioned the tread 12 and sidewalls 14, 16. The left hand sidewall 14 is preferably of one piece construction, and will constitute that part of the tire that is mounted so as to face inwardly of the vehicle. The other sidewall 16 is a composite of an upper sidewall strip 18, and two lower sidewall strips 20a and 20b separated from one another by a strip of decorative rubber 22, for example, white rubber. A strip 24 of protective rubber extends from the interface 19 between the upper sidewall 18 and the lower sidewall 20a down around the bead, terminating at the foot 8a thereof. Typically, a tough long-wearing rubber such as a blend of polybutadiene and SBR (styrene butadiene rubber) compounded with a reinforcing filler such as carbon black and other additives, is used for the tread 12. An elastomer such as SBR is used for the lower sidewall 14 and upper sidewall 18 and contains various antidegradents such as antiozonants to enhance the weathering characteristics of the rubber. These antidegradents in the rubber have a tendency to migrate or bleed out of the rubber and into the environment surrounding this rubber. If this environment is composed of a white or light colored rubber, the additives will often cause staining and discoloration of the same. Accordingly, as shown in FIGURE 1, the upper sidewall, composed of a staining rubber is spaced from the decorative strip 22 by a layer 20a of a non-staining rubber. Another layer 20b of non-staining rubber is disposed on the other side of the decorative strip 22. Covering all of this is the protective layer of non-staining but highly weather resistant rubber of the present invention.

Normally the tread 12 and the staining rubber stock 14, 18 are extruded as a dual extrusion and are applied around the carcass in one assembly operation followed by partial stitching against the carcass. Likewise, the decorative strip 22 and the non-staining rubber strips 20a, 20b, are extruded as a unitary assembly and are wrapped around the carcass abutting the upper sidewall strip 18. The protective layer 24 may be calendered directly on to the extruded sidewall compound at the tuber or alternatively may be applied after the sidewall composite is assembled onto the carcass on the drum. In any event the entire assembly is then stitched down, after which the tire is placed in a mold and is shaped and vulcanized. Upon removal of the tire from the mold, a portion of the protective layer 24 is buffed off or is otherwise removed to expose the decorative strip 22.

FIGURE 3 shows one modification of the composite sidewall assembly of FIGURE 1. In this alternative embodiment the strip of decorative rubber 50 is disposed between the sidewall 52 composed of typical sidewall stock and a layer 54 of non-staining rubber. The protective layer 56 extends from the foot of the bead 58 over the non-staining stock 54 and the decorative strip 50 terminating in the area of the sidewall strip 52. With this arrangement, staining will occur between the interface of the decorative strip 50 and the sidewall rubber strip 52 due to the migration of the antiozonant into the decorative strip. However, this migration is not normally noticeable for more than about ¼ inch. Therefore, when buffing off the portion of the protective layer 56, care should be taken to insure that at least ¼ inch is maintained between the exposed part of the decorative strip and the nearest contact point between the decorative strip and the staining rubber.

FIGURE 4 shows an arrangement of components that is particularly suitable for the construction of radial ply tires. In a radial ply tire, the cords of the carcass are disposed at right angles to the circumferential plane of the tire. In order to provide stability, an inextensible breaker is wrapped around the exterior of the carcass underneath the tire tread. Because of the inextensible nature of the breaker, it is normally difficult to complete all of the building steps on a flat drum as is the case with bias type tires. Instead, the carcass and sidewalls are assembled on the flat drum followed by shaping of the assembly into a torus on a separate piece of equipment. Thereafter, the inextensible breaker and the tread are wrapped around the carcass to complete the construction.

In carrying out the teachings of the present invention in the construction of a radial ply tire, a carcass 102 is built on a flat drum 100 and the ends of the carcass are folded around inextensible bead bundles 104. An extruded sidewall 106, composed of non-staining rubber provided with a groove in which is disposed a strip 108 of decorative material, is wrapped around the tire adjacent one shoulder of the drum while a second sidewall (not shown) prepared from typical sidewall stock is positioned near the other shoulder. Over this decorative strip 108 is a protective layer of elastomeric material 110. After the carcass is shaped, the breaker 112 and tread 114 are applied as shown in FIGURE 5 and a strip 116 of weather resistant rubber such as SBR is laid over the exposed part of the non-staining sidewall 106 to protect it from ozone attack. Following the curing of the tire, a strip of the protective layer 110 is removed to expose a portion of the decorative strip 108.

As previously stated, the protective layer of the present invention is composed of an elastomeric blend of ethylene propylene terpolymer, natural rubber and chlorobutyl rubber. The ethylene propylene terpolymer improves processability of the elastomeric blend and imparts high ozone resistance to the same. It acts as a filler in the blend and accordingly increases the air diffusion rate thereof thus obviating the problem of blister formation. However, the tack of the blend is correspondingly reduced as the amount of terpolymer is increased. Therefore, no more than about 30 parts or preferably no more than about 20 parts are used per 100 parts of RHC (rubber hydrocarbon). The chlorobutyl when used in an amount of at least about 20 parts, imparts exceptionally good weathering characteristics to the blend. However, it is extremely impermeable to the diffusion of air, and it possesses poor green strength at elevated temperatures. The natural rubber serves, when used in an amount of between about 40 and about 60 parts, to increase the strength at elevated temperatures and to improve the green tack of this blend while the EPT helps to offset the poor diffusion rate.

In addition to the blend of elastomers, other ingredients are needed in order to improve the processability and wearing characteristics of the novel protective layer, as well as to permit the blend to be cured along with the other compounds of the tire during vulcanization. The following table lists a typical formulation, incorporating the teachings of the present invention. It is understood, however, that the ratio of the elastomers can be varied as previously mentioned, and in addition substitutions can be made in the other components without affecting the scope of protection of the invention.

| Component: | Parts |
|---|---|
| Chlorobutyl | 30.00 |
| Natural rubber | 50.00 |
| EPT | 20.00 |
| HAF black | 25.00 |
| MT black | 75.00 |
| Magnesium oxide | 0.50 |
| Stearic acid | 1.00 |
| Wax | 3.00 |
| Naphthenic oil | 12.00 |
| Sulfur | 0.40 |
| Zinc oxide | 5.00 |
| Benzothiazyl disulfide accelerator | 1.00 |
| Alkyl phenol disulfide vulcanizing agent | 1.34 |
| Total | 224.24 |

The abrasion resistance of the composition can be further improved by increasing the amount of high abrasion furnace (HAF) black to 50 parts while reducing the amount of medium thermal (MT) black to 50 parts.

The elastomeric compound is typically prepared by blending the components in a two-stage Banbury mixer. All of the components except the accelerators and vulcanizing agents are blended together in the relatively high temperature first stage of the Banbury to form a master batch. The remaining ingredients are then incorporated into the blend in the second stage of the Banbury mixer. The material is then calendered into a layer having a thickness of about 0.02 inch which layer is then trimmed to the correct width ready for application over the decorative strip.

A diene monomer is normally selected as the third component in ethylene propylene terpolymer blend. It has been found that a terpolymer employing dicyclopentadiene and marketed by Naugatuck under the trademark Royalene 301 gives outstanding results when used with natural rubber and chlorobutyl to form the protective cover of the present invention. However, other EPT rubbers wherein the third monomer is selected from the group comprising cyclooctadiene, norbornene and hexadiene, can also be used to give improved protective covers.

As previously mentioned, various changes can be made in the formulation without deviating from the scope of the invention, which is limited by the appended claims in which I claim:

1. In a cured pneumatic tire including a decorative strip in the sidewall thereof the improvement comprising a non-staining protective cover strip disposed over and adhered to the unexposed portion of said decorative strip and containing, based upon 100 parts of RHC, a blend of between about 40 and about 60 parts of natural rubber, between about 20 and about 50 parts of chlorobutyl and from about 10 to about 30 parts of an ethylene propylene terpolymer.

2. A strip of material adapted to be used as a protective layer over the decorative strip in the sidewall of a pneumatic tire comprising a non-staining elastomeric blend containing, based upon 100 parts of RHC, between about 40 to about 60 parts of natural rubber, about 20 to about 50 parts of chlorobutyl rubber and about 10 to about 30 parts of an ethylene propylene terpolymer.

3. The strip according to claim 2 wherein the third monomer used in the terpolymer is dicyclopentadiene.

4. The strip according to claim 3 further including at least about 50 parts of high abrasion furnace black.

5. The cured pneumatic tire according to claim 1 wherein the third monomer in the ethylene propylene terpolymer is dicyclopentadiene.

6. The pneumatic tire according to claim 5 wherein said cover strip contains at least 50 parts of high abrasion furnace black.

References Cited

UNITED STATES PATENTS

| | | | |
|---|---|---|---|
| 3,285,314 | 11/1966 | Roberts | 152—353 |
| 3,356,764 | 12/1967 | Gentile | 260—5 |
| 3,311,151 | 3/1967 | Willis et al. | 260—5 |
| 3,419,639 | 12/1968 | Gentile | 260—5 |
| 3,443,619 | 5/1969 | Kindle | 152—330 |

ARTHUR L. LA POINT, Primary Examiner

C. B. LYON, Assistant Examiner

U.S. Cl. X.R.

152—353; 260—5